United States Patent
Lin et al.

(10) Patent No.: US 12,431,817 B2
(45) Date of Patent: Sep. 30, 2025

(54) FLYBACK POWER CONVERTER AND SECONDARY SIDE POWER SUPPLY CIRCUIT AND CONTROL METHOD THEREOF

(71) Applicant: Richtek Technology Corporation, Zhubei (TW)

(72) Inventors: Shin-Li Lin, Hsinchu (TW); He-Yi Shu, Nantou (TW); Shih-Jen Yang, New Taipei (TW); Ta-Yung Yang, Taoyuan (TW); Yi-Min Shiu, Hsinchu (TW); Chih-Ching Lee, Hsinchu (TW); Yu-Chieh Hsieh, Taipei (TW); Chao-Chi Chen, New Taipei (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 234 days.

(21) Appl. No.: 18/473,221

(22) Filed: Sep. 23, 2023

(65) Prior Publication Data
US 2024/0146205 A1    May 2, 2024

Related U.S. Application Data

(60) Provisional application No. 63/381,338, filed on Oct. 28, 2022.

(30) Foreign Application Priority Data

May 24, 2023    (TW) .................................. 112119352

(51) Int. Cl.
*H02M 3/335*    (2006.01)
*H02M 1/00*    (2006.01)

(52) U.S. Cl.
CPC ..... *H02M 3/33592* (2013.01); *H02M 1/0032* (2021.05); *H02M 1/0045* (2021.05);
(Continued)

(58) Field of Classification Search
CPC .......... H02M 3/33592; H02M 1/0032; H02M 1/0045; H02M 3/33507; H02M 3/33523; H02M 1/0048
See application file for complete search history.

(56) References Cited

U.S. PATENT DOCUMENTS 10,651,754 B1 *  5/2020  Murugesan ....... H02M 3/33523
10,693,384 B1 *  6/2020  Mondal ............ H02M 3/33592
(Continued)

*Primary Examiner* — Yusef A Ahmed
(74) *Attorney, Agent, or Firm* — Tung @ Associates

(57) ABSTRACT

A flyback power converter includes a power transformer, a first lossless voltage conversion circuit, a first low-dropout linear regulator and a secondary side power supply circuit. The first low-dropout linear regulator (LDO) generates a first operation voltage as power supply for being supplied to a sub-operation circuit. The secondary side power supply circuit includes a second lossless voltage conversion circuit and a second LDO. The second LDO generates a second operation voltage. The first operation voltage and the second operation voltage are shunted to a common node. When a first lossless conversion voltage is greater than a first threshold voltage, the second LDO is enabled to generate the second operation voltage to replace the first operation voltage as power supply supplied to the sub-operation circuit; wherein the second lossless conversion voltage is lower than the first lossless switching voltage.

27 Claims, 7 Drawing Sheets

(52) U.S. Cl.
CPC ... *H02M 3/33507* (2013.01); *H02M 3/33523* (2013.01); *H02M 1/0048* (2021.05)

(56) References Cited

U.S. PATENT DOCUMENTS

| | | | | |
|---|---|---|---|---|
| 11,206,727 | B1* | 12/2021 | Palliyil Chundethodiyil | ............... H05B 47/18 |
| 2002/0110005 | A1* | 8/2002 | Mao | .................. H02M 3/33592 363/21.06 |
| 2005/0213353 | A1* | 9/2005 | Lys | ...................... H02M 1/425 363/17 |
| 2006/0285368 | A1* | 12/2006 | Schlecht | ............. H02M 3/3374 363/21.06 |
| 2007/0024255 | A1* | 2/2007 | Yasumura | ........... H02M 3/3385 363/16 |
| 2007/0047275 | A1* | 3/2007 | Hesterman | ............ H02M 3/335 363/95 |
| 2010/0118566 | A1* | 5/2010 | Kwon | ............... H02M 3/33561 363/21.09 |
| 2011/0019446 | A1* | 1/2011 | Wu | ................... H02M 3/33523 363/79 |
| 2011/0032732 | A1* | 2/2011 | Hsu | ................... H02M 3/33561 363/21.14 |
| 2011/0103104 | A1* | 5/2011 | Zhan | ................. H02M 3/33507 363/21.17 |
| 2011/0310639 | A1* | 12/2011 | Hsu | ................... H02M 3/33561 363/21.14 |
| 2015/0207414 | A1* | 7/2015 | Halberstadt | ....... H02M 3/33592 363/21.14 |
| 2015/0263531 | A1* | 9/2015 | Kozakai | .................. H02J 50/10 307/104 |
| 2015/0280573 | A1* | 10/2015 | Gong | ................ H02M 3/33592 363/21.14 |
| 2017/0033694 | A1* | 2/2017 | Tseng | ................ H02M 3/33561 |
| 2018/0212528 | A1* | 7/2018 | Tang | ...................... H02M 1/08 |
| 2018/0323717 | A1* | 11/2018 | Chang | ..................... H02M 1/36 |
| 2019/0020277 | A1* | 1/2019 | Liu | ............................. H03K 7/08 |
| 2020/0251984 | A1* | 8/2020 | Sartler | .................... H02M 1/44 |
| 2021/0143730 | A1* | 5/2021 | Yang | ................. H02M 3/33507 |
| 2021/0384838 | A1* | 12/2021 | Chang | ................ H02M 1/0025 |
| 2023/0369986 | A1* | 11/2023 | Wen | ................. H02M 3/33507 |
| 2023/0396179 | A1* | 12/2023 | Jitaru | ................. H02M 1/0058 |

* cited by examiner

FLYBACK POWER CONVERTER AND SECONDARY SIDE POWER SUPPLY CIRCUIT AND CONTROL METHOD THEREOF

CROSS REFERENCE

The present invention claims priority to the U.S. provisional patent application Ser. No. 63/381,338, filed on Oct. 28, 2022 and claims priority to TW patent application Ser. No. 112119352, filed on May 24, 2023, all of which foregoing mentioned provisional and nonprovisional patent applications are incorporated herein in their entirety by their reference.

BACKGROUND OF THE INVENTION

Field of Invention

The present invention relates to a flyback power converter and a secondary side power supply circuit and a control method thereof; particularly, it relates to such flyback power converter and such secondary side power supply circuit as well as such control method capable of enhancing power conversion efficiency at a secondary side.

Description of Related Art

Please refer to FIG. 1, which shows a schematic circuit diagram of a conventional flyback power converter 10. The conventional flyback power converter 10 converts an input voltage Vin to an output voltage Vout. As shown in FIG. 1, the conventional flyback power converter 10 comprises: a primary side control circuit 100, a primary side switch SW1, a power transformer TR1, a synchronous rectification switch SW2, a synchronous rectification control chip 200, a protocol chip 300 and a power cord switch SW3.

As shown in FIG. 1, the power transformer TR1 is coupled between the input voltage Vin and the output voltage Vout via electromagnetic induction. The power transformer TR1 includes: a primary side winding W1 and a secondary side winding W2, wherein the primary side winding W1 is coupled to the input voltage Vin, whereas, the secondary side winding W2 is coupled to the output voltage Vout. The primary side control circuit 100 produces a switching signal S1C based upon a feedback signal FB, so as to control the primary side switch SW1 coupled to the primary side winding W1, thus switching the primary side winding W1 and to thereby convert the input voltage Vin, so that the secondary side winding W2 generates the output voltage Vout.

As shown in FIG. 1, the synchronous rectification control chip 200 serves to produce a synchronous rectification signal S2C for controlling the synchronous rectification switch SW2, so as to conduct an operation of synchronous rectification at a secondary side of the power transformer TR1. The protocol chip 300 serves to communicate with circuits (not shown in FIG. 1) external to the conventional flyback power converter 10 through a protocol, such as a serial communication, such that the protocol chip 300 provides the output voltage Vout to the external circuits. The protocol chip 300 is for example a universal serial bus (USB) chip. As a result, in this case, the protocol chip 300 (i.e., a USB chip) is coupled to the external circuits by having a pin CS+, a pin CS−, a pin CC1 and a pin CC2 of the protocol chip 300 coupled to a corresponding pin CS+, a corresponding pin CS−, a corresponding pin CC1 and a corresponding pin CC2 of the external circuits, thus executing a protocol communication. Additionally, the protocol chip 300 converts the output voltage Vout to the feedback signal FB, wherein the feedback signal FB is transmitted to the primary side control circuit 100 via photocoupling. Moreover, the protocol chip 300 generates a power supply control signal S3C for controlling the power cord switch SW3.

The prior art shown in FIG. 1 has following drawbacks that: in a typical flyback power converter 10, because applications of circuits at the secondary side (e.g., as shown by the synchronous rectification control chip 200 and the protocol chip 300 in FIG. 1) of the power transformer TR1 is more and more widely spread, there is a likelihood that a scope of the output voltage Vout may range from 5V to 48V. Consequently and undesirably, in this case, electrical power consumption of the synchronous rectification control chip 200 and the protocol chip 300 is more and more increased, so that power conversion efficiency of the circuits at the secondary side is unwantedly reduced; particularly, when the conventional flyback power converter 10 operates in a light load condition, an adverse impact on power conversion efficiency of the entire system is more dramatic, the details of which will be fully described below.

As shown in FIG. 1, a pin VDD of the synchronous rectification control chip 200 receives the output voltage Vout. The thus received output voltage Vout is processed by a low-dropout linear regulator (LDO) inside of the synchronous rectification control chip 200. Subsequently, the output voltage Vout processed by the LDO generates a synchronous rectification regulator voltage Vb across a synchronous rectification capacitor Cb located between a pin VB and a ground pin GND. As a result, in this case, the accordingly generated synchronous rectification regulator voltage Vb functions as a power supply which is being supplied to other circuits inside of the synchronous rectification control chip 200, except the LDO.

Furthermore, as shown in FIG. 1, a pin VDD of the protocol chip 300 receives the output voltage Vout. The thus received output voltage Vout is processed by a low-dropout linear regulator (LDO) inside of the protocol chip 300. Subsequently, the output voltage Vout processed by the LDO generates a protocol voltage Vs across a protocol capacitor Cs located between a pin VS and a ground pin GND. As a result, in this case, the accordingly generated protocol voltage Vs functions as a power supply which is being supplied to other circuits inside of the protocol chip 300, except the LDO.

In light of foregoing descriptions, the prior art shown in FIG. 1 has following further drawbacks that: in a case where a voltage drop across an input end and an output end of each LDO of the synchronous rectification control chip 200 and the protocol chip 300 is relatively greater, power conversion efficiency of the conventional flyback power converter 10 is unwantedly reduced. Consequently, in this case, when a load current having a relatively greater current level is in the presence, an excessive consumption will undesirably emerge.

In view of the above, to overcome the drawbacks in the prior art, the present invention proposes a flyback power converter and a secondary side power supply circuit as well as a control method thereof capable of enhancing power conversion efficiency at a secondary side.

SUMMARY OF THE INVENTION

From one perspective, the present invention provides a flyback power converter, which is configured to operably convert an input voltage to an output voltage; the flyback power converter comprising: a power transformer including: a primary side winding coupled to the input voltage; and a secondary side winding coupled to the output voltage; a first lossless voltage conversion circuit, which is configured to operably convert a secondary side winding voltage across the secondary side winding in a lossless fashion, to generate a first lossless conversion voltage; a first low-dropout linear regulator (LDO) coupled to the first lossless voltage conversion circuit, wherein the first LDO is configured to operably and linearly convert the first lossless conversion voltage to a first operation voltage at a common node, wherein the first operation voltage functions as a power supply which is being supplied to a sub-operation circuit coupled to the secondary side winding; and a secondary side power supply circuit including: a second lossless voltage conversion circuit, which is configured to operably convert the secondary side winding voltage across the secondary side winding in the lossless fashion, to generate a second lossless conversion voltage; a second LDO coupled to the second lossless voltage conversion circuit, wherein when the first lossless conversion voltage is greater than a first threshold voltage, the second LDO is configured to operably and linearly convert the second lossless conversion voltage to a second operation voltage at the common node, so that the first operation voltage is replaced by the second operation voltage and the second operation voltage functions as the power supply which is being supplied to the sub-operation circuit; wherein the first operation voltage and the second operation voltage are shunted to the common node; wherein each of the first LDO and the second LDO is a LDO which solely provides power in a unidirectional fashion; wherein the second lossless conversion voltage is lower than the first lossless conversion voltage.

From another perspective, the present invention provides a secondary side power supply circuit for use in a flyback power converter, wherein the flyback power converter is configured to operably convert an input voltage to an output voltage; wherein the flyback power converter includes: a power transformer including: a primary side winding coupled to the input voltage; and a secondary side winding coupled to the output voltage; a first lossless voltage conversion circuit, which is configured to operably convert a secondary side winding voltage across the secondary side winding in a lossless fashion, to generate a first lossless conversion voltage; a first low-dropout linear regulator (LDO) coupled to the first lossless voltage conversion circuit, wherein the first LDO is configured to operably and linearly convert the first lossless conversion voltage to a first operation voltage at a common node, wherein the first operation voltage function as a power supply which is being supplied to a sub-operation circuit coupled to the secondary side winding; and the secondary side power supply circuit; the secondary side power supply circuit comprising: a second lossless voltage conversion circuit, which is configured to operably convert the secondary side winding voltage across the secondary side winding in the lossless fashion, to generate a second lossless conversion voltage; and a second LDO coupled to the second lossless voltage conversion circuit, wherein when the first lossless conversion voltage is greater than a first threshold voltage, the second LDO is configured to operably and linearly convert the second lossless conversion voltage to a second operation voltage at the common node, so that the first operation voltage is replaced by the second operation voltage and the second operation voltage functions as the power supply which is being supplied to the sub-operation circuit; wherein the first operation voltage and the second operation voltage are shunted to the common node; wherein each of the first LDO and the second LDO is a LDO which solely provides power in a unidirectional fashion; wherein the second lossless conversion voltage is lower than the first lossless conversion voltage.

From yet another perspective, the present invention provides a control method of a flyback power converter, wherein the control method is configured to operably control the flyback power converter, so as to convert an input voltage to an output voltage; the control method comprising following steps: converting a secondary side winding voltage across a secondary side winding in a lossless fashion, to generate a first lossless conversion voltage; linearly converting the first lossless conversion voltage to a first operation voltage at a common node, wherein the first operation voltage functions as a power supply which is being supplied to a sub-operation circuit coupled to the secondary side winding; converting the secondary side winding voltage across the secondary side winding in the lossless fashion, to generate a second lossless conversion voltage; when the first lossless conversion voltage is greater than a first threshold voltage, linearly converting the second lossless conversion voltage to a second operation voltage at the common node, so that the first operation voltage is replaced by the second operation voltage and the second operation voltage functions as the power supply which is being supplied to the sub-operation circuit; and shunting the first operation voltage and the second operation voltage to the common node; wherein the second lossless conversion voltage is lower than the first lossless conversion voltage.

In one embodiment, the second operation voltage is greater than the first operation voltage, and wherein when the second operation voltage is generated due to a situation where the second LDO is enabled, a situation where the first operation voltage and the second operation voltage are shunted to the common node incurs that: the common node is configured to operably provide the second operation voltage for functioning as the power supply which is being supplied to the sub-operation circuit.

In one embodiment, the first threshold voltage is positively correlated with the first operation voltage.

In one embodiment, the sub-operation circuit includes: a synchronous regulation (SR) circuit and/or a protocol circuit.

In one embodiment, the first lossless voltage conversion circuit includes: a winding tapping route, an auxiliary winding or a switched capacitor circuit.

In one embodiment, the flyback power converter further comprises: a first rectifier circuit; wherein the secondary side winding voltage functions as a first lossless divided voltage; wherein the first rectifier circuit is configured to operably rectify the first lossless divided voltage, so as to generate the first lossless conversion voltage; wherein the first lossless conversion voltage is the output voltage.

In one embodiment, the second lossless voltage conversion circuit includes: a winding tapping route, an auxiliary winding or a switched capacitor circuit.

In one embodiment, the second lossless voltage conversion circuit is configured to operably convert the secondary side winding voltage across the secondary side winding in the lossless fashion, to generate a second lossless divided voltage; wherein the secondary side power supply circuit further includes: a second rectifier circuit, which is configured to operably rectify the second lossless divided voltage, so as to generate the second lossless conversion voltage.

In one embodiment, the secondary side power supply circuit further includes: a threshold comparator, which is configured to operably compare the second lossless conversion voltage with a second lossless threshold voltage, so as to generate a threshold comparison result signal; wherein the threshold comparison result signal is positively correlated with a difference between the first lossless conversion voltage and the first threshold voltage, such that when the first lossless conversion voltage is greater than the first threshold voltage, the threshold comparison result signal enables the second LDO to generate the second operation voltage.

In one embodiment, the second lossless conversion voltage is lower than a peak voltage of the secondary side winding voltage.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
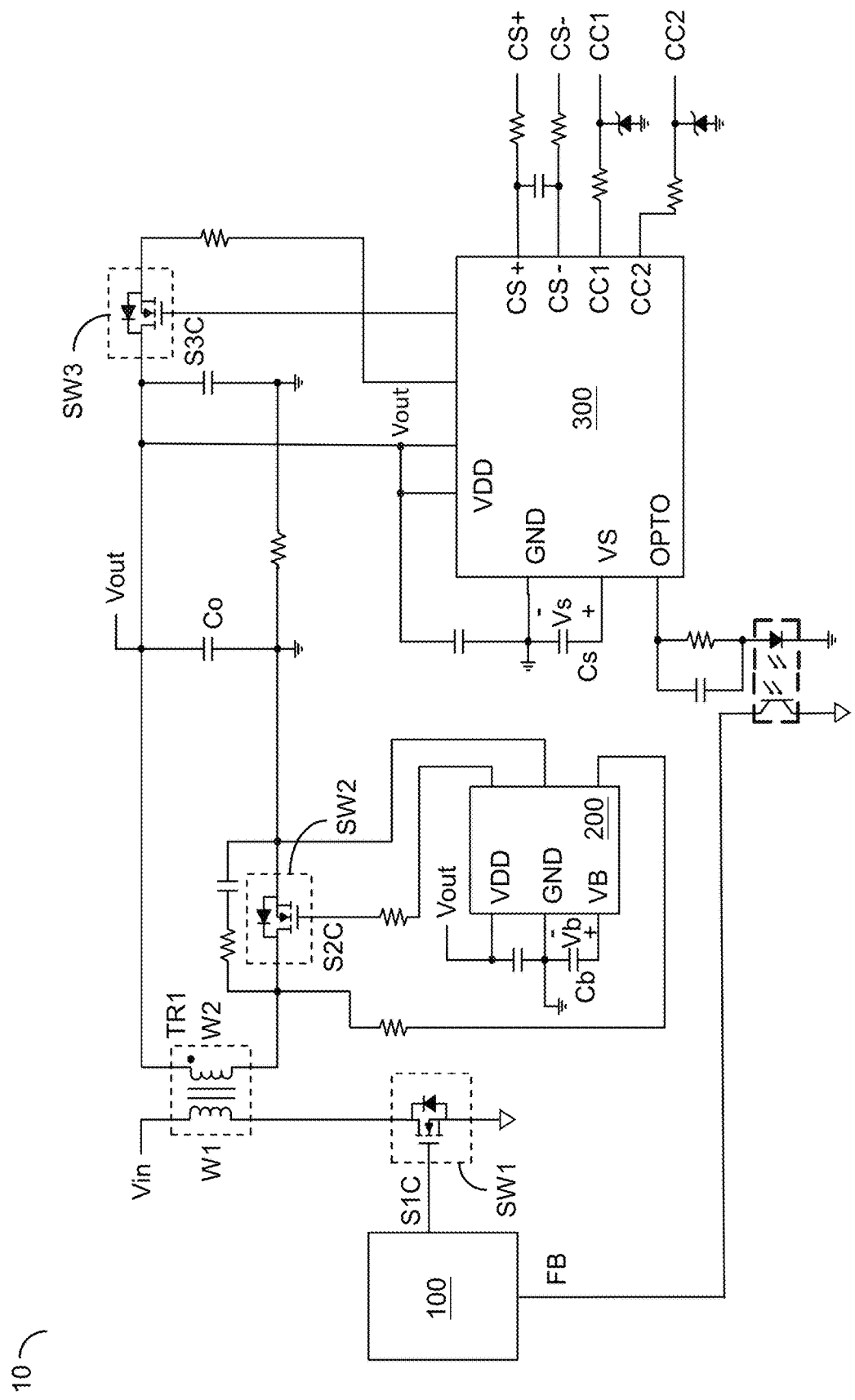
FIG. 1 shows a schematic circuit diagram of a conventional flyback power converter.
Figure 2:
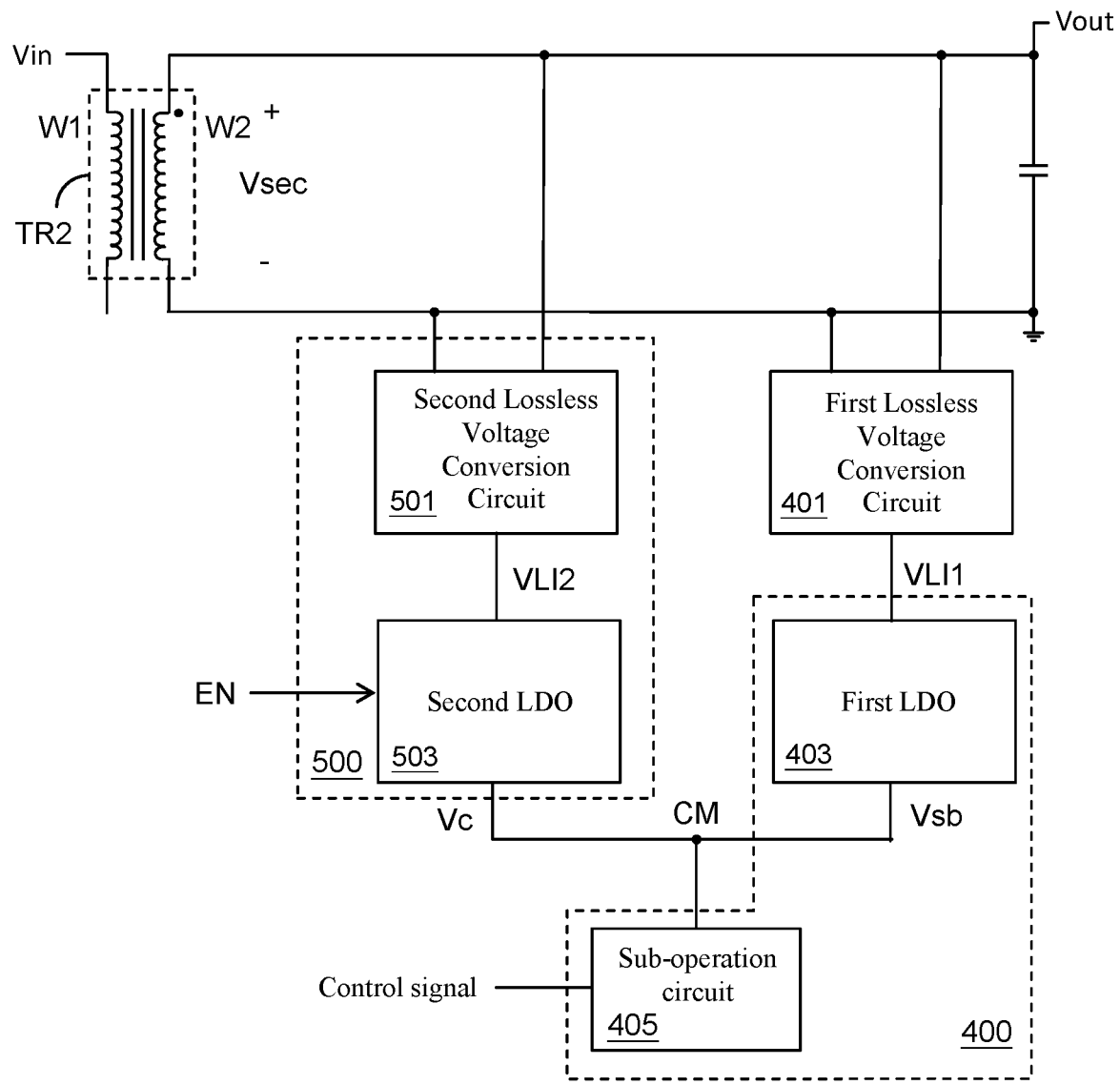
FIG. 2 shows a schematic circuit diagram of a flyback power converter according to an embodiment of the present invention.

FIG. 2 shows a schematic circuit diagram of a flyback power converter according to an embodiment of the present invention. As shown in FIG. 2, the flyback power converter 20 of the present invention is configured to operably convert an input voltage Vin to an output voltage Vout. The flyback power converter 20 of the present invention comprises: a power transformer TR2, a first lossless voltage conversion circuit 401, a first low-dropout linear regulator (LDO) 403, a sub-operation circuit 405 and a secondary side power supply circuit 500.

As shown in FIG. 2, the power transformer TR2 includes: a primary side winding W1 and a secondary side winding W2, wherein the primary side winding W1 is coupled to the input voltage Vin, whereas, the secondary side winding W2 is coupled to the output voltage Vout. The first lossless voltage conversion circuit 401 is configured to operably convert a secondary side winding voltage Vsec across the secondary side winding W2 in a lossless fashion, to generate a first lossless conversion voltage VLI1. The first LDO 403 is coupled to the first lossless voltage conversion circuit 401, wherein the first LDO 403 is configured to operably and linearly convert the first lossless conversion voltage VLI1 to a first operation voltage Vsb at a common node CM, wherein the first operation voltage Vsb functions as a power supply which is being supplied to a sub-operation circuit 405 coupled to the secondary side winding W2.

Please still refer to FIG. 2. The secondary side power supply circuit 500 includes: a second lossless voltage conversion circuit 501 and a second LDO 503. The second lossless voltage conversion circuit 501 is configured to operably convert the secondary side winding voltage Vsec across the secondary side winding W2 in the lossless fashion, to generate a second lossless conversion voltage VLI2. The second LDO 503 is coupled to the second lossless voltage conversion circuit 501, wherein when the first lossless conversion voltage VLI1 is greater than a first threshold voltage Vth1 (not shown in FIG. 2, but will be fully elaborated later), the second LDO 503 is configured to operably and linearly convert the second lossless conversion voltage VLI2 to a second operation voltage Vc at the common node CM, so that the first operation voltage Vsb is replaced by the second operation voltage Vc and the second operation voltage Vc functions as the power supply which is being supplied to the sub-operation circuit 405. The first operation voltage Vsb and the second operation voltage Vc are shunted to the common node CM. Each of the first LDO 403 and the second LDO 503 is a LDO which solely provides power in a unidirectional fashion. The second lossless conversion voltage VLI2 is lower than the first lossless conversion voltage VLI1.

In one embodiment, the second lossless conversion voltage VLI2 is lower than a peak voltage of the secondary side winding voltage Vsec. Generally speaking, during a scenario where the flyback power converter 20 is in normal operation, the secondary side winding voltage Vsec is being switched between a relatively greater voltage and a relatively lower voltage due to a situation where a primary side switch (not shown) is being switched. Consequently, in this case, the second lossless conversion voltage VLI2 according to the present invention is lower than a maximum voltage of the secondary side winding voltage Vsec during switching of the secondary side winding voltage Vsec, wherein such maximum voltage of the secondary side winding voltage Vsec is literally a peak voltage of the secondary side winding voltage Vsec.

It is worthwhile noting that, as one having ordinary skill in the art readily understands, the term. "converting the secondary side winding voltage Vsec across the secondary side winding W2 in the lossless fashion", as may be used herein, refers to: executing voltage conversion on the secondary side winding voltage Vsec via lossless devices, such as an inductor, a capacitor, a transformer and so on. Besides, note that although it is preferred for the aforementioned "lossless devices" to achieve exact efficacy where there is none electrical power consumption due to an ideal scenario where the aforementioned "lossless devices" will not incur electrical power consumption in application, however due to errors and features caused by practical manufacturing process of electronic components and electronic circuits, the aforementioned "lossless devices" may not achieve exact efficacy where there is none electrical power consumption. In other words, according to the present invention, a certain level of electrical power consumption is acceptable and is within the broadest scope of the present invention.

It is worthwhile noting that, each of the first LDO 403 and the second LDO 503 is a LDO which solely provides power in a unidirectional fashion and each of the first LDO 403 and the second LDO 503 has its own corresponding output end electrically connected to the common node CM, so in a case where the second operation voltage Vc is greater than the first operation voltage Vsb, a voltage at the common node CM is literally the second operation voltage Vc.

The present invention is advantageous over the prior art, in that: when the first lossless conversion voltage VLI1 (e.g., one of exemplary implementation of the first lossless conversion voltage VLI1 is the output voltage Vout) is greater than the first threshold voltage Vth1 (i.e., in one embodiment, in this case, the first threshold voltage Vth1 is positively correlated with the first operation voltage Vsb; that is, when the a difference between the output voltage Vout and the first operation voltage Vsb is relatively greater), the flyback power converter 20 of the present invention is switched to replace the first operation voltage Vsb having a relatively lower power conversion efficiency and provided from the first LDO 403 by the second operation voltage Vc having a relatively greater power conversion efficiency and provided from the secondary side power supply circuit 500, so that the second operation voltage Vc functions as the power supply which is being supplied to circuits at the secondary side (e.g., the sub-operation circuit 405). As a result, in this case, power conversion efficiency for the power supply at the secondary side is enhanced.

For example, when the output voltage Vout is of 48 volts (V), according to the prior art, the LDO inside the synchronous rectification control chip 200 and the LDO inside the protocol chip 300 receive this voltage having a relatively greater level (i.e., 48V) and subsequently conduct an operation of linear conversion on this voltage having a relatively greater level (i.e., 48V) to become a voltage having a relatively lower level (e.g., 3V), such that the thus linearly converted voltage having a relatively lower level (e.g., 3V) function as the synchronous rectification regulator voltage Vb and the protocol voltage Vs. That is, each input end receiving voltage of the LDO inside the synchronous rectification control chip 200 and the LDO inside the protocol chip 300 is equal to 48V. And, each output end of the LDO inside the synchronous rectification control chip 200 and the LDO inside the protocol chip 300 generates a voltage equal to 3V for functioning as a power supply. As a result, in this case, a voltage drop across the input end and the output end of each LDO of the synchronous rectification control chip 200 and the protocol chip 300 is equal to 45V, which is a relatively greater voltage level. As far as a LDO is concerned, power conversion efficiency of the conventional flyback power converter 10 is unwantedly reduced. Consequently, in this case, when a load current having a relatively greater current level is in the presence, an excessive electrical power consumption will undesirably emerge.

According to the present invention, in one embodiment, the first LDO 403 and the sub-operation circuit 405 constitutes a secondary side chip 400. The secondary side chip 400 can include, for example but not limited to, a synchronous rectification control chip 200 and/or a protocol chip 300. The sub-operation circuit 405 can include, for example but not limited to, a synchronous regulation (SR) circuit and/or a protocol circuit. That is, according to the present invention, for example, the secondary side chip 400 can include, for example but not limited to, the synchronous rectification control chip 200 and/or the protocol chip 300. Besides, the first lossless conversion voltage VLI1 is, for example but not limited to, the output voltage Vout. When the output voltage Vout is greater than a voltage level equal to 26V (i.e., when the first threshold voltage Vth1 is for example equal to 26V), if the present invention adopts the LDO inside of the synchronous rectification control chip 200 to render the synchronous rectification regulator voltage Vb to function as a power supply which is being supplied to other circuits inside of the synchronous rectification control chip 200, except the LDO and if the present invention adopts the LDO inside of the protocol chip 300 to render the protocol voltage Vs to function as a power supply which is being supplied to other circuits inside of the protocol chip 300, except the LDO, power conversion efficiency of the present invention will become extremely low, thus resulting in a relatively greater electrical power consumption.

To prevent the foregoing drawback from occurring, according to the present invention, in one embodiment, the secondary side power supply circuit 500 of the present invention is configured to operably convert the secondary side winding voltage Vsec (e.g., 48V) in a lossless fashion, to generate a divided voltage, namely a second lossless conversion voltage VLI2 (e.g., 5V). In addition, the secondary side power supply circuit 500 of the present invention is configured to operably enable the second LDO 503, to generate the second operation voltage Vc (e.g., 3.3V). Because the first operation voltage Vsb (e.g., 3V) and second operation voltage Vc (e.g., 3.3V) provided from the synchronous rectification control chip 200 and/or the protocol chip 300 are shunted to the common node CM, a voltage at the common node CM will be the second operation voltage Vc (e.g., 3.3V), which replaces the first operation voltage Vsb (e.g., 3V). As a result, in this case, the second operation voltage Vc (e.g., 3.3V) functions as the power supply which is being supplied to the sub-operation circuit 405. Consequently, in this circumstance, in one embodiment, in a case where the output voltage Vout is relatively greater (e.g., the output voltage Vout is greater than a voltage level of 26V), the first operation voltage Vsb is replaced by the second operation voltage Vc provided by the secondary side power supply circuit 500 and the second operation voltage Vc functions as the power supply which is being supplied to the sub-operation circuit 405, thus enhancing power conversion efficiency at the secondary side of the power transformer TR2 and reducing electrical power consumption.

Please still refer to FIG. 2. In one embodiment, the second operation voltage Vc is greater than the first operation voltage Vsb. In addition, when the second operation voltage Vc is generated due to a situation where the second LDO 503 is enabled, a situation where the first operation voltage Vsb and the second operation voltage Vc are shunted to the common node CM incurs that: the common node CM is configured to operably provide the second operation voltage Vc for functioning as the power supply which is being supplied to the sub-operation circuit 405.

Please still refer to FIG. 2. In one embodiment, the first threshold voltage Vth1 is positively correlated with the first operation voltage Vsb. In the prior art flyback power converter 10, the greater a difference between the output voltage Vout and the synchronous rectification regulator voltage Vb or the greater a difference between the output voltage Vout and the protocol voltage Vs, the poorer the power conversion efficiency of the prior art flyback power converter 10. In order to improve power conversion efficiency of the prior art, in one embodiment of the present invention, the first threshold voltage Vth1 is decided based upon a sum of the first operation voltage Vsb plus a preordained voltage. As a result, in this case, such preordained voltage can be a constant voltage or a variable voltage, which can be decided in accordance with the power conversion efficiency of the first LDO 403 and the power conversion efficiency of the second LDO 503. In one embodiment, the greater the first operation voltage Vsb, the greater the first threshold voltage Vth1.

Figure 3A:
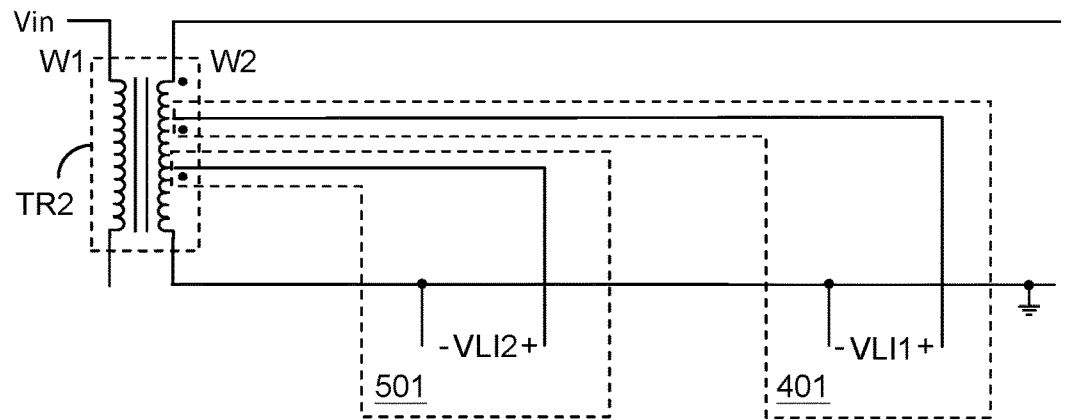
FIG. 3A to FIG. 3C show schematic circuit diagrams of a first lossless voltage conversion circuit 401 and a second lossless voltage conversion circuit 501 according to several embodiments of the present invention.
Figure 3B:
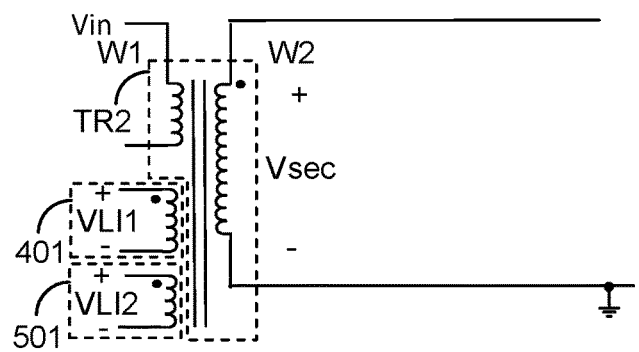
Figure 3C:
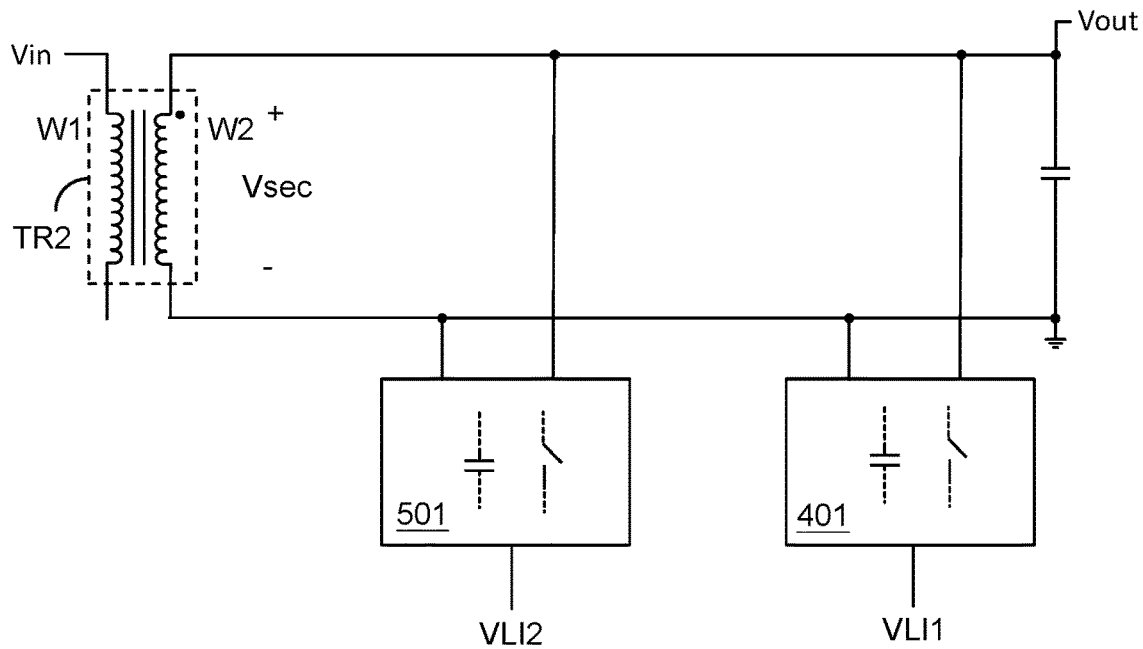

FIG. 3A to FIG. 3C respectively show schematic circuit diagrams of a first lossless voltage conversion circuit 401 and a second lossless voltage conversion circuit 501 according to different embodiments of the present invention. FIG. 3A shows that each of the first lossless voltage conversion circuit 401 and the second lossless voltage conversion circuit 501 is a winding tapping route. FIG. 3B shows that each of the first lossless voltage conversion circuit 401 and the second lossless voltage conversion circuit 501 is an auxiliary winding. FIG. 3C shows that each of the first lossless voltage conversion circuit 401 and the second lossless voltage conversion circuit 501 is a switched capacitor circuit. It should be understood that the respective implementation of each of the first lossless voltage conversion circuit 401 and the second lossless voltage conversion circuit 501 as a same type circuit, such as a winding tapping route (implementation shown in FIG. 3A), an auxiliary winding (implementation shown in FIG. 3B) or a switched capacitor circuit (implementation shown in FIG. 3C) in the above-mentioned preferred different embodiments is only an illustrative example, but not for limiting the broadest scope of the present invention. In other embodiments, it is also practicable and within the broadest scope of the present invention that each of the first lossless voltage conversion circuit 401 and the second lossless voltage conversion circuit 501 can be implemented as a different type circuit. As a result, in this case, the first lossless voltage conversion circuit 401 can be a winding tapping route, whereas, the second lossless voltage conversion circuit 501 can be an auxiliary winding. Other different combinations can be derived, and so on.

Figure 4:
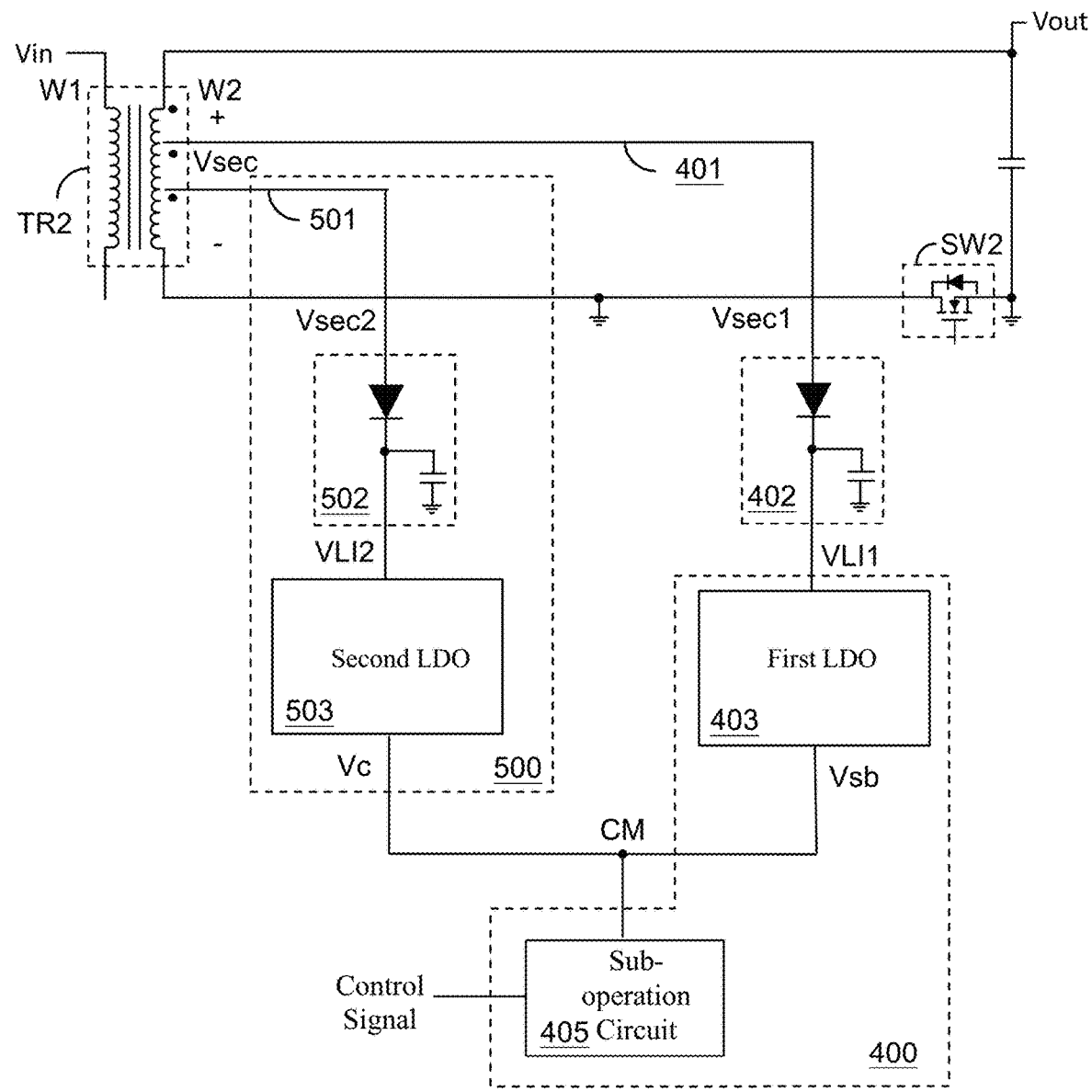
FIG. 4 shows a schematic circuit diagram of a flyback power converter according to an embodiment of the present invention.
Figure 5A:
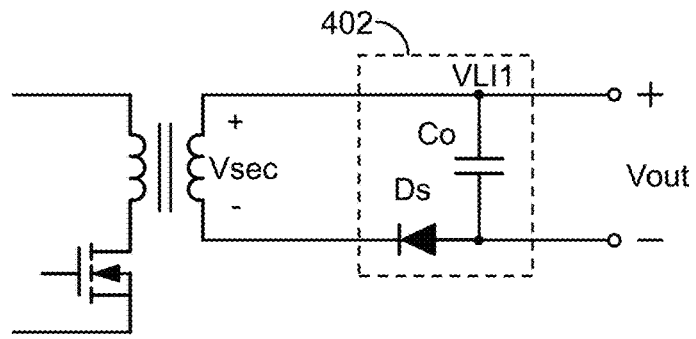
FIG. 5A to FIG. 5D respectively show schematic circuit diagrams of a first rectifier circuit 402 according to different embodiments of the present invention.
Figure 5B:
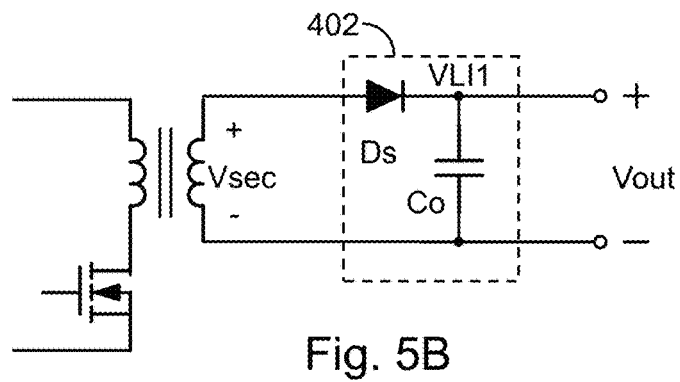
Figure 5C:
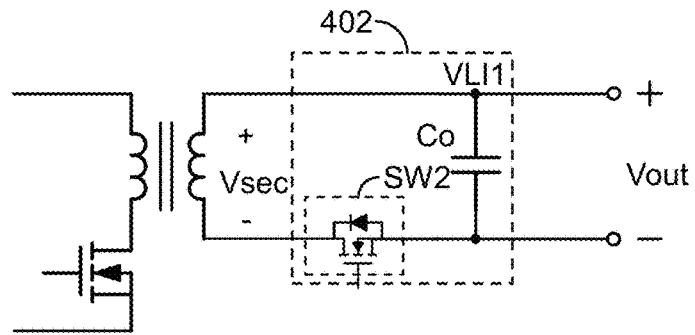
Figure 5D:
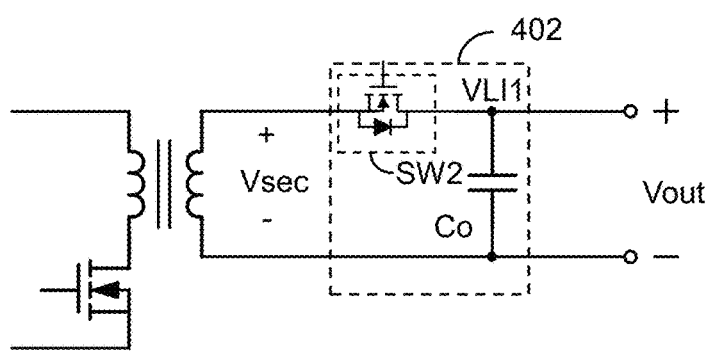

FIG. 4 shows a schematic circuit diagram of a flyback power converter 40 according to an embodiment of the present invention. In one embodiment, as compared to the flyback power converter 20 of the embodiment shown in FIG. 2, the flyback power converter 40 of this embodiment shown in FIG. 4 further comprises: a first rectifier circuit 402. The first rectifier circuit 402 is configured to operably rectify a first lossless divided voltage Vsec1, so as to generate a first lossless conversion voltage VLI1. In one embodiment, the first lossless conversion voltage VLI1 is, for example but not limited to, an output voltage Vout.

As shown in FIG. 4, a power transformer TR2 includes: a primary side winding W1 and a secondary side winding W2, wherein the primary side winding W1 is coupled to an input voltage Vin, whereas, the secondary side winding W2 is coupled to the output voltage Vout. The first lossless voltage conversion circuit 401 includes, for example but not limited to, a winding tapping route and the first lossless voltage conversion circuit 401 is configured to operably convert a secondary side winding voltage Vsec across the secondary side winding W2 in a lossless fashion, to generate a first lossless divided voltage Vsec1. The first rectifier circuit 402 is configured to operably rectify the first lossless divided voltage Vsec1, so as to generate the first lossless conversion voltage VLI1. A first LDO 403 is coupled to the first lossless voltage conversion circuit 401, wherein the first LDO 403 is configured to operably and linearly convert the first lossless conversion voltage VLI1 to a first operation voltage Vsb at a common node CM, wherein the first operation voltage Vsb functions as a power supply which is being supplied to a sub-operation circuit 405 coupled to the secondary side winding W2. In one embodiment, the first LDO 403 and the sub-operation circuit 405 constitutes a secondary side chip 400. The secondary side chip 400 can include, for example but not limited to, a synchronous rectification control chip 200. The sub-operation circuit 405 can include, for example but not limited to, a synchronous regulation (SR) circuit, wherein the SR circuit is configured to operably produce a control signal for controlling a synchronous rectification switch SW2.

Please still refer to FIG. 4. The secondary side power supply circuit 500 includes: a second lossless voltage conversion circuit 501, a second rectifier circuit 502 and a second LDO 503. The second lossless voltage conversion circuit 501 includes, for example but not limited to, a winding tapping route and the second lossless voltage conversion circuit 501 is configured to operably convert a secondary side winding voltage Vsec across the secondary side winding W2 in a lossless fashion, to generate a second lossless divided voltage Vsec2. The second rectifier circuit 502 is configured to operably rectify the second lossless divided voltage Vsec2, so as to generate the second lossless conversion voltage VLI2. The second LDO 503 is coupled to the second lossless voltage conversion circuit 501, wherein when the first lossless conversion voltage VLI1 is greater than a first threshold voltage Vth1, the second LDO 503 is configured to operably and linearly convert the second lossless conversion voltage VLI2 to a second operation voltage Vc at the common node CM, so that the first operation voltage Vsb is replaced by the second operation voltage Vc and the second operation voltage Vc functions as the power supply which is being supplied to the sub-operation circuit 405. The first operation voltage Vsb and the second operation voltage Vc are shunted to the common node CM.

FIG. 5A to FIG. 5D respectively show schematic circuit diagrams of a first rectifier circuit 402 according to different embodiments of the present invention. In the embodiments shown in FIG. 5A to FIG. 5D, each secondary side winding voltage Vsec all function as a first lossless divided voltage Vsec1. Besides, in the embodiments shown in FIG. 5A to FIG. 5D, each first rectifier circuit 402 is configured to operably rectify each corresponding first lossless divided voltage Vsec1, so as to generate each corresponding first lossless conversion voltage VLI1 (i.e., the secondary side winding voltage Vsec). In the embodiments shown in FIG. 5A to FIG. 5D, the first lossless conversion voltage VLI1 is literally an output voltage Vout. In one embodiment, the first rectifier circuit 402 includes: an output capacitor Co and a secondary side diode Ds. Or, in alternative embodiment, the first rectifier circuit 402 includes: an output capacitor Co and a synchronous rectification switch SW2. The synchronous rectification switch SW2 has a parasitic capacitor within, which functions in a same way as the secondary side diode Ds. Because of the output capacitor Co, the secondary side diode Ds and the synchronous rectification switch SW2 are typically required devices for conducting an operation of synchronous rectification at the secondary side, the output capacitor Co, the secondary side diode Ds and the synchronous rectification switch SW2 can be straightforwardly adopted to function as a first rectifier circuit 402 of the present invention.

It is worthwhile noting that, a second rectifier circuit 502 according to the present invention can be implemented through adopting a circuitry configuration of the first rectifier circuit 402 shown in FIG. 5A to FIG. 5D (i.e., a circuitry configuration constituted by a capacitor and a diode), where nodes for electrical connection are simply required to be correspondingly adjusted. Certainly, in other embodiments, it is also practicable and within the broadest scope of the present invention that the first rectifier circuit 402 and the second rectifier circuit 502 can be any other type of rectifier circuits, where it is simply required for such other type of rectifier circuits to respectively accomplish an efficacy of rectification on the first lossless conversion voltage VLI1 and the second lossless conversion voltage VLI2.

Figure 6A:
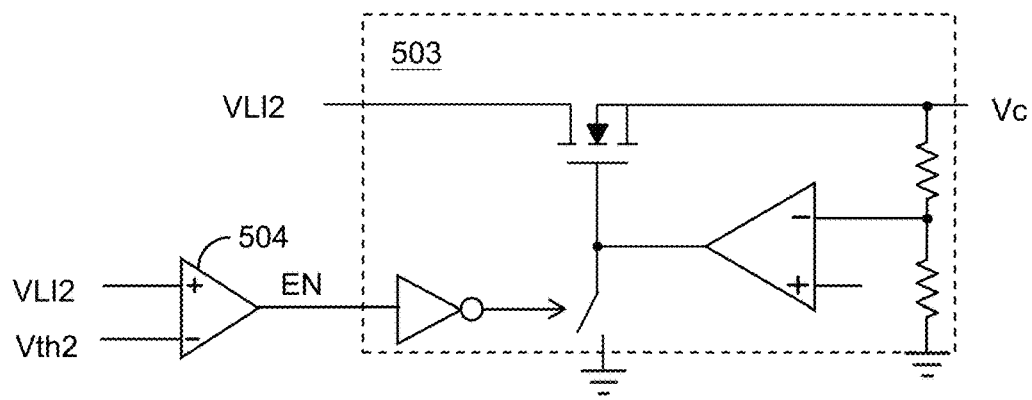
FIG. 6A to FIG. 6C respectively show schematic circuit diagrams of a second LDO 503 and a threshold comparator 504 according to different embodiments of the present invention.
Figure 6B:
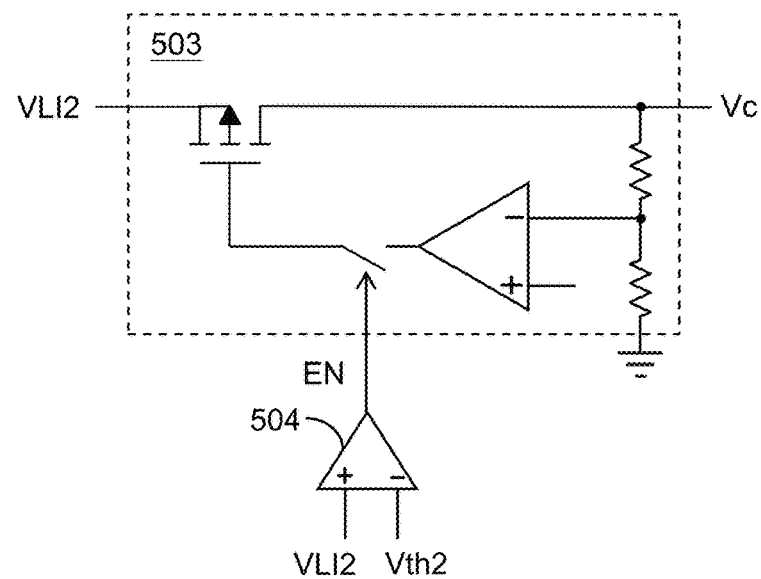
Figure 6C:
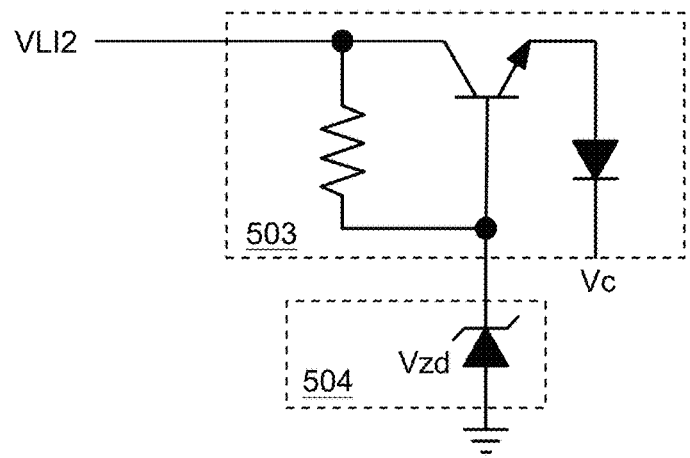

FIG. 6A to FIG. 6C respectively show schematic circuit diagrams of a second LDO 503 and a threshold comparator 504 according to different embodiments of the present invention. As shown in FIG. 6A, the second LDO 503 includes, for example, an N-type metal oxide semiconductor (MOS) device and a comparator. The threshold comparator 504 is configured to operably compare for example a second lossless conversion voltage VLI2 with a second lossless threshold voltage Vth2, so as to generate a threshold comparison result signal EN. The threshold comparison result signal EN is positively correlated with a difference between a first lossless conversion voltage VLI1 and a first threshold voltage Vth1, such that when the first lossless conversion voltage VLI1 is greater than the first threshold voltage Vth1, the threshold comparison result signal EN enables the second LDO 503 to generate a second operation voltage Vc. Because each of the first lossless conversion voltage VLI1 and the second lossless conversion voltage VLI2 is generated after an operation of voltage division and an operation of rectification have been executed on the secondary side winding voltage Vsec, a ratio relationship exists between the first lossless conversion voltage VLI1 and the second lossless conversion voltage VLI2. As a consequence, in this case, a second threshold voltage Vth2 can be obtained via the ratio relationship exists between the first lossless conversion voltage VLI1 and the second lossless conversion voltage VLI2 as well as the first threshold voltage Vth1, such that a difference between the second lossless conversion voltage VLI2 and the second threshold voltage Vth2 is correlated with a difference between the first lossless conversion voltage VLI1 and the first threshold voltage Vth1.

As shown in FIG. 6A, the threshold comparison result signal EN serves to control for example a switch coupled to a gate of the aforementioned N-type MOS device. To be more specific, for example, when the second lossless conversion voltage VLI2 is greater than the second threshold voltage Vth2, the threshold comparison result signal EN serves to turn OFF the above-said switch coupled to the gate of the aforementioned N-type MOS device, to enable the second LDO 503 to generate the second operation voltage Vc. For another example, when the second lossless conversion voltage VLI2 is not greater than the second threshold voltage Vth2, the threshold comparison result signal EN serves to turn ON the above-said switch coupled to the gate of the aforementioned N-type MOS device, to electrically connect the gate of the N-type MOS device to a ground potential, so that the second LDO 503 will cease generating the second operation voltage Vc.

As shown in FIG. 6B, the second LDO 503 includes, for example, a P-type MOS device and a comparator. The threshold comparator 504 is configured to operably compare for example a second lossless conversion voltage VLI2 with a second lossless threshold voltage Vth2, so as to generate a threshold comparison result signal EN. The threshold comparison result signal EN is positively correlated with a difference between a first lossless conversion voltage VLI1 and a first threshold voltage Vth1, such that when the first lossless conversion voltage VLI1 is greater than the first threshold voltage Vth1, the threshold comparison result signal EN enables the second LDO 503 to generate a second operation voltage Vc. As shown in FIG. 6B, the threshold comparison result signal EN serves to control for example a switch coupled between a gate of the aforementioned P-type MOS device and the comparator. To be more specific, for example, when the second lossless conversion voltage VLI2 is greater than the second threshold voltage Vth2, the threshold comparison result signal EN serves to turn ON the above-said switch coupled between the gate of the aforementioned P-type MOS device and the comparator, to enable the second LDO 503 to generate the second operation voltage Vc. For another example, when the second lossless conversion voltage VLI2 is not greater than the second threshold voltage Vth2, the threshold comparison result signal EN serves to turn OFF the above-said switch coupled between the gate of the aforementioned P-type MOS device and the comparator, to electrically connect the gate of the N-type MOS device to a ground potential, so that the second LDO 503 will cease generating the second operation voltage Vc.

As shown in FIG. 6C, the second LDO 503 includes, for example, a bipolar junction transistor (BJT), a resistor and a diode. The threshold comparator 504 includes, for example, a Zener diode. When the second lossless conversion voltage VLI2 is greater than the second threshold voltage Vth2, this embodiment turns ON the BJT via a breakdown voltage Vzd of the Zener diode, so as to enable the second LDO 503 to generate a second operation voltage Vc.

Figure 7:
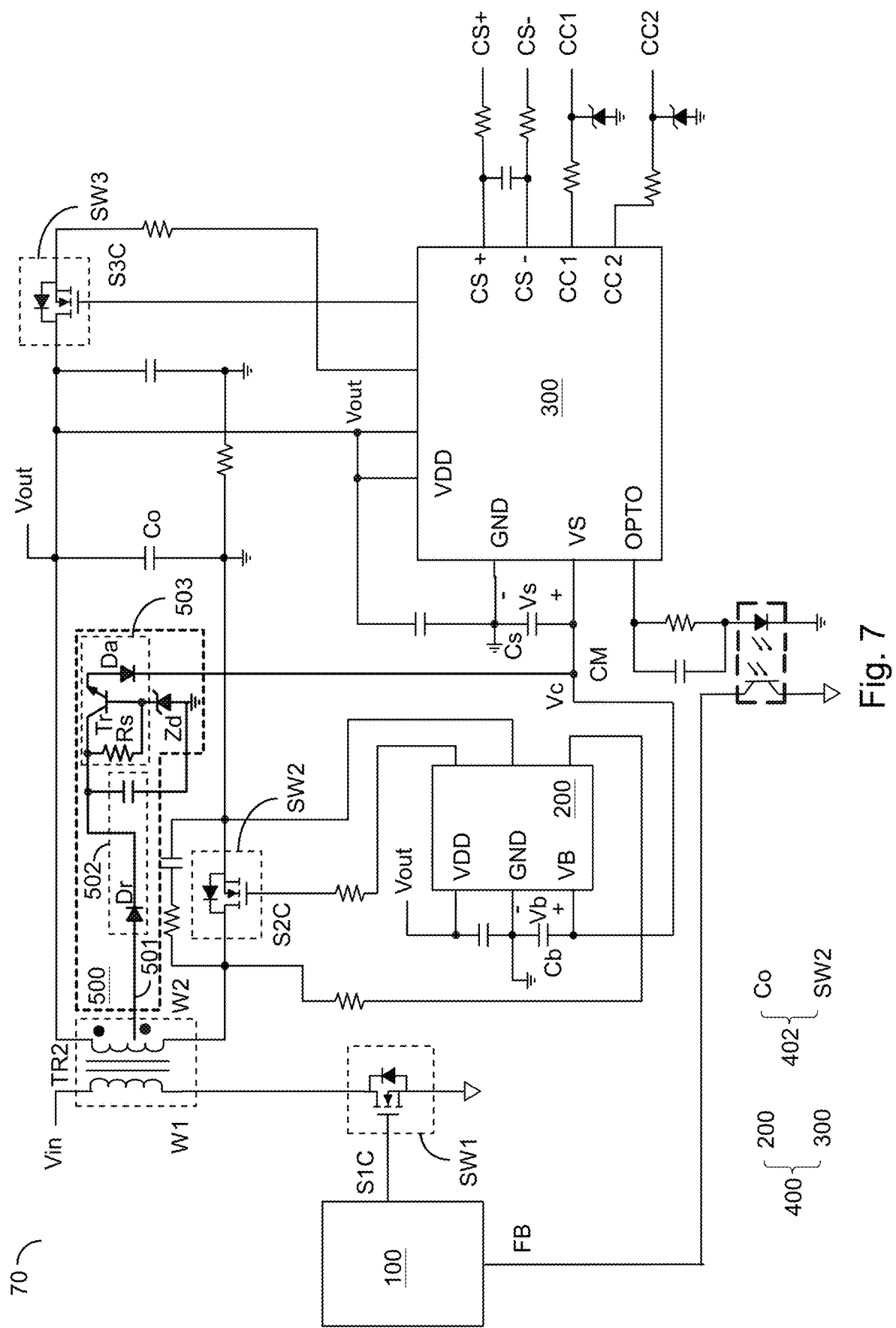
FIG. 7 shows a schematic circuit diagram of a flyback power converter according to an embodiment of the present invention.

FIG. 7 shows a schematic circuit diagram of a flyback power converter 70 according to an embodiment of the present invention. In this embodiment, as shown in FIG. 7, the flyback power converter 70 of the present invention comprises: a primary side control circuit 100, a primary side switch SW1, a power transformer TR2, a first rectifier circuit 402, a secondary side chip 400, a power cord switch SW3 and a secondary side power supply circuit 500. In this embodiment, the secondary side chip 400 can include, for example but not limited to, a synchronous rectification control chip 200 and/or a protocol chip 300. The first rectifier circuit 402 includes: an output capacitor Co and a synchronous rectification switch SW2. The secondary side power supply circuit 500 and the synchronous rectification control chip 200 included in the flyback power converter 70 of this embodiment shown in FIG. 7 have same circuitry configuration as the secondary side power supply circuit 500 and the synchronous rectification control chip 200 included in the flyback power converter 20 of the embodiment shown in FIG. 2, those skilled in this art can refer to the foregoing descriptions and explanations pertinent to the embodiment shown in FIG. 2, so the details thereof are not redundantly repeated here.

FIG. 7 is an exemplary implantation and is meant to elucidate that the present invention is capable of executing efficacy of power supply switching through adjusting a turn ratio of a secondary side winding W2, thus enhancing power conversion efficiency. For example, during a situation where the flyback power converter 70 is in a normal operation, the secondary side chip 400 (which includes a synchronous rectification control chip 200 and a protocol chip 300) has a net current of 10 mA. Besides, during a situation where the flyback power converter 70 is in a normal operation, an output voltage Vout has a lowest voltage level equal to 5V and a highest voltage level equal to 48V. In addition, during a situation where the flyback power converter 70 is in a normal operation, let it be designed that: when the output voltage Vout is greater than a voltage level equal to 26V (i.e., when the first threshold voltage Vth1 is for example equal to 26V), power supply required by the secondary side chip 400 is provided from the secondary side power supply circuit 500. In this embodiment, let it be assumed that: the second lossless voltage conversion circuit 501 is for example a winding tapping route, the second operation voltage Vc is of 6V, a forward bias voltage Vf of a diode Dr and a forward bias voltage Vf of a diode Da are of 0.8V, a base-emitter voltage Vbe of a BJT Tr is of 0.7V. Based upon the above-mentioned information, this embodiment can extrapolate a breakdown voltage Vzd of a Zener diode Zd, which can be represented by following equation:

$$Vzd=Vc+Vf+Vbe=6V+0.8V+0.7V=7.5V$$

In this embodiment, let it be assumed that: a regulation voltage minimum current after the Zener diode Zd has already suffered breakdown is of 10 uA and a regulation voltage resistance Rs is of 100 KΩ. Based upon the above-mentioned information, this embodiment can extrapolate a second lossless divided voltage Vsec2 corresponding to a situation where the output voltage Vout is of 26V, which can be represented by following equation:

$$Vsec2(26V)=Vzd+(10\ uA*100\ K\Omega)+Vf=7.5V+1V+0.8V$$

As a result, in this case, this embodiment can extrapolate a turn ratio of the secondary side winding W2 of the power transformer TR2, which can be represented by following equation:

$$(Vout-Vsec2)/Vsec2=(26V-9.3V)/9.3V\approx1.8$$

As a result, in this case, this embodiment can extrapolate a second lossless divided voltage Vsec2 corresponding to a situation where the output voltage Vout is of 48V, which can be represented by following equation:

$$Vsec2(48V)=48V/(1.8+1)=17.14V$$

As a result, in this case, based upon the above-mentioned information, when the output voltage Vout is of 48V, this embodiment can extrapolate electrical power consumption Ppri in a case where power supply is provided by the prior art, wherein electrical power consumption Ppri can be represented by following equation:

$$Ppri=48V*10\ mA=480\ mW$$

According to the present invention, when the power supply is provided by the secondary side power supply circuit 500, a net electrical power consumption Pinv of the primary side control circuit 100, the synchronous rectification control chip 200, the BJT Tr, the regulation voltage resistance Rs and the diode Dr and Da is a sum of a chip electrical power consumption Pchip plus a BJT electrical power consumption Ptr plus a resistor electrical power consumption Prs plus a diode electrical power consumption Pd, which can be represented by following equation:

$$Pinv=Pchip+Ptr+Prs+Pd$$

$$Pchip=(7.5V-0.7V-0.8V)*10\ mA=60\ mW$$

$$Ptr=(17.14V-0.8V-7.5V-0.7V)*10\ mA=81\ mW$$

$$Prs=(17.14V-0.8V-7.5V)2/100\ K\Omega=0.78\ mW$$

$$Pd=2*10\ mA*0.8V=16\ mW$$

Based upon the foregoing computation results, it demonstrates that: when the power supply is provided by the secondary side power supply circuit 500, in a case where the output voltage Vout is of 48V, the chip electrical power consumption Pchip will be reduced from 480 mW (corresponding to the prior art) to 60 mW (corresponding to the present invention). Moreover, additional electrical power consumption of the present invention, namely the BJT electrical power consumption Ptr, the resistor electrical power consumption Prs and the diode electrical power consumption Pd are of 81 mW, 0.78 mW and 16 mW, respectively. As a consequence, as compared to the electrical power consumption of the prior art (which is of 480 mW), the net electrical power consumption Pinv of the present invention is of 157.8 mW. Hence, the present invention is advantageous over the prior art, in that: the present invention dramatically reduces electrical power consumption of the circuits at the secondary side in the flyback power converter.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:
1. A flyback power converter, which is configured to operably convert an input voltage to an output voltage; the flyback power converter comprising:
  a power transformer including:
    a primary side winding coupled to the input voltage; and
    a secondary side winding coupled to the output voltage;
  a first lossless voltage conversion circuit, which is configured to operably convert a secondary side winding voltage across the secondary side winding in a lossless fashion, to generate a first lossless conversion voltage;
  a first low-dropout linear regulator (LDO) coupled to the first lossless voltage conversion circuit, wherein the first LDO is configured to operably and linearly convert the first lossless conversion voltage to a first operation voltage at a common node, wherein the first operation voltage functions as a power supply which is being supplied to a sub-operation circuit coupled to the secondary side winding; and a secondary side power supply circuit including:
a second lossless voltage conversion circuit, which is configured to operably convert the secondary side winding voltage across the secondary side winding in the lossless fashion, to generate a second lossless conversion voltage;
a second LDO coupled to the second lossless voltage conversion circuit, wherein when the first lossless conversion voltage is greater than a first threshold voltage, the second LDO is configured to operably and linearly convert the second lossless conversion voltage to a second operation voltage at the common node, so that the first operation voltage is replaced by the second operation voltage and the second operation voltage functions as the power supply which is being supplied to the sub-operation circuit; and
a threshold comparator, which is configured to operably compare the second lossless conversion voltage with a second lossless threshold voltage, so as to generate a threshold comparison result signal;
wherein the first operation voltage and the second operation voltage are shunted to the common node;
wherein each of the first LDO and the second LDO is an LDO which solely provides power in a unidirectional fashion;
wherein the second lossless conversion voltage is lower than the first lossless conversion voltage; and
wherein the threshold comparison result signal is positively correlated with a difference between the first lossless conversion voltage and the first threshold voltage, such that when the first lossless conversion voltage is greater than the first threshold voltage, the threshold comparison result signal enables the second LDO to generate the second operation voltage.

2. The flyback power converter as claimed in claim 1, wherein the second operation voltage is greater than the first operation voltage, and wherein when the second operation voltage is generated due to a situation where the second LDO is enabled, a situation where the first operation voltage and the second operation voltage are shunted to the common node incurs that: the common node is configured to operably provide the second operation voltage for functioning as the power supply which is being supplied to the sub-operation circuit.

3. The flyback power converter as claimed in claim 1, wherein the first threshold voltage is positively correlated with the first operation voltage.

4. The flyback power converter as claimed in claim 1, wherein the sub-operation circuit includes: a synchronous regulation (SR) circuit or a protocol circuit.

5. The flyback power converter as claimed in claim 1, wherein the first lossless voltage conversion circuit includes: a winding tapping route, an auxiliary winding or a switched capacitor circuit.

6. The flyback power converter as claimed in claim 1, further comprising:
a first rectifier circuit;
wherein the secondary side winding voltage functions as a first lossless divided voltage;
wherein the first rectifier circuit is configured to operably rectify the first lossless divided voltage, so as to generate the first lossless conversion voltage; and
wherein the first lossless conversion voltage is the output voltage.

7. The flyback power converter as claimed in claim 1, wherein the second lossless voltage conversion circuit includes: a winding tapping route, an auxiliary winding or a switched capacitor circuit.

8. The flyback power converter as claimed in claim 1, wherein the second lossless voltage conversion circuit is configured to operably convert the secondary side winding voltage across the secondary side winding in the lossless fashion, to generate a second lossless divided voltage;
wherein the secondary side power supply circuit further includes:
a second rectifier circuit, which is configured to operably rectify the second lossless divided voltage, so as to generate the second lossless conversion voltage.

9. The flyback power converter as claimed in claim 1, wherein the second lossless conversion voltage is lower than a peak voltage of the secondary side winding voltage.

10. A secondary side power supply circuit for use in a flyback power converter, wherein the flyback power converter is configured to operably convert an input voltage to an output voltage; wherein the flyback power converter includes: a power transformer including: a primary side winding coupled to the input voltage; and a secondary side winding coupled to the output voltage; a first lossless voltage conversion circuit, which is configured to operably convert a secondary side winding voltage across the secondary side winding in a lossless fashion, to generate a first lossless conversion voltage; a first low-dropout linear regulator (LDO) coupled to the first lossless voltage conversion circuit, wherein the first LDO is configured to operably and linearly convert the first lossless conversion voltage to a first operation voltage at a common node, wherein the first operation voltage function as a power supply which is being supplied to a sub-operation circuit coupled to the secondary side winding; and the secondary side power supply circuit; the secondary side power supply circuit comprising:
a second lossless voltage conversion circuit, which is configured to operably convert the secondary side winding voltage across the secondary side winding in the lossless fashion, to generate a second lossless conversion voltage;
a second LDO coupled to the second lossless voltage conversion circuit, wherein when the first lossless conversion voltage is greater than a first threshold voltage, the second LDO is configured to operably and linearly convert the second lossless conversion voltage to a second operation voltage at the common node, so that the first operation voltage is replaced by the second operation voltage and the second operation voltage functions as the power supply which is being supplied to the sub-operation circuit; and
a threshold comparator, which is configured to operably compare the second lossless conversion voltage with a second lossless threshold voltage, so as to generate a threshold comparison result signal;
wherein the threshold comparison result signal is positively correlated with a difference between the first lossless conversion voltage and the first threshold voltage, such that when the first lossless conversion voltage is greater than the first threshold voltage, the threshold comparison result signal enables the second LDO to generate the second operation voltage;
wherein the first operation voltage and the second operation voltage are shunted to the common node;
wherein each of the first LDO and the second LDO is an LDO which solely provides power in a unidirectional fashion; and wherein the second lossless conversion voltage is lower than the first lossless conversion voltage.

11. The secondary side power supply circuit as claimed in claim 10, wherein the second operation voltage is greater than the first operation voltage, and wherein when the second operation voltage is generated due to a situation where the second LDO is enabled, a situation where the first operation voltage and the second operation voltage are shunted to the common node incurs that: the common node is configured to operably provide the second operation voltage for functioning as the power supply which is being supplied to the sub-operation circuit.

12. The secondary side power supply circuit as claimed in claim 10, wherein the first threshold voltage is positively correlated with the first operation voltage.

13. The secondary side power supply circuit as claimed in claim 10, wherein the sub-operation circuit includes: a synchronous regulation (SR) circuit or a protocol circuit.

14. The secondary side power supply circuit as claimed in claim 10, wherein the first lossless voltage conversion circuit includes: a winding tapping route, an auxiliary winding or a switched capacitor circuit.

15. The secondary side power supply circuit as claimed in claim 10, wherein the flyback power converter further includes: a first rectifier circuit;
wherein the secondary side winding voltage functions as a first lossless divided voltage;
wherein the first rectifier circuit is configured to operably rectify the first lossless divided voltage, so as to generate the first lossless conversion voltage; and
wherein the first lossless conversion voltage is the output voltage.

16. The secondary side power supply circuit as claimed in claim 10, wherein the second lossless voltage conversion circuit includes: a winding tapping route, an auxiliary winding or a switched capacitor circuit.

17. The secondary side power supply circuit as claimed in claim 10, wherein the second lossless voltage conversion circuit is configured to operably convert the secondary side winding voltage across the secondary side winding in the lossless fashion, to generate a second lossless divided voltage;
wherein the secondary side power supply circuit further includes:
a second rectifier circuit, which is configured to operably rectify the second lossless divided voltage, so as to generate the second lossless conversion voltage.

18. The secondary side power supply circuit as claimed in claim 10, wherein the second lossless conversion voltage is lower than a peak voltage of the secondary side winding voltage.

19. A control method of a flyback power converter, wherein the control method is configured to operably control the flyback power converter, so as to convert an input voltage to an output voltage; the control method comprising following steps:
converting a secondary side winding voltage across a secondary side winding in a lossless fashion, to generate a first lossless conversion voltage;
linearly converting the first lossless conversion voltage to a first operation voltage at a common node, wherein the first operation voltage functions as a power supply which is being supplied to a sub-operation circuit coupled to the secondary side winding;
converting the secondary side winding voltage across the secondary side winding in the lossless fashion, to generate a second lossless conversion voltage;
when the first lossless conversion voltage is greater than a first threshold voltage, linearly converting the second lossless conversion voltage to a second operation voltage at the common node, so that the first operation voltage is replaced by the second operation voltage and the second operation voltage functions as the power supply which is being supplied to the sub-operation circuit;
shunting the first operation voltage and the second operation voltage to the common node; and
comparing the second lossless conversion voltage with a second lossless threshold voltage, so as to generate a threshold comparison result signal;
wherein the threshold comparison result signal is positively correlated with a difference between the first lossless conversion voltage and the first threshold voltage, such that when the first lossless conversion voltage is greater than the first threshold voltage, the threshold comparison result signal enables a second LDO to generate the step for generating the second operation voltage at the common node; and
wherein the second lossless conversion voltage is lower than the first lossless conversion voltage.

20. The control method as claimed in claim 19, wherein the second operation voltage is greater than the first operation voltage, and wherein when the second operation voltage is generated, a situation where the first operation voltage and the second operation voltage are shunted to the common node incurs that: the common node is configured to operably provide the second operation voltage for functioning as the power supply which is being supplied to the sub-operation circuit.

21. The control method as claimed in claim 19, wherein the first threshold voltage is positively correlated with the first operation voltage.

22. The control method as claimed in claim 19, wherein the sub-operation circuit includes: a synchronous regulation (SR) circuit or a protocol circuit.

23. The control method as claimed in claim 19, wherein the step for converting the secondary side winding voltage across the secondary side winding in the lossless fashion to generate the first lossless conversion voltage includes following steps:
providing a winding tapping route, an auxiliary winding or a switched capacitor circuit, wherein the winding tapping route, the auxiliary winding or the switched capacitor circuit is coupled to the secondary side winding.

24. The control method as claimed in claim 19, further comprising following steps:
rendering the secondary side winding voltage to function as a first lossless divided voltage;
rectifying the first lossless divided voltage, so as to generate the first lossless conversion voltage; and
rendering the first lossless conversion voltage to function as the output voltage.

25. The control method as claimed in claim 19, wherein the step for converting the secondary side winding voltage across the secondary side winding in the lossless fashion to generate the second lossless conversion voltage includes following steps:
providing a winding tapping route, an auxiliary winding or a switched capacitor circuit, wherein the winding tapping route, the auxiliary winding or the switched capacitor circuit is coupled to the secondary side winding.

26. The control method as claimed in claim 19, further comprising following steps:
   rendering the secondary side winding voltage to function as a second lossless divided voltage; and
   rectifying the second lossless divided voltage, so as to generate the second lossless conversion voltage.

27. The control method as claimed in claim 19, wherein the second lossless conversion voltage is lower than a peak voltage of the secondary side winding voltage.

\* \* \* \* \*